No. 887,074. PATENTED MAY 12, 1908.
A. DEPAGE.
SURGICAL SCREW BOLT.
APPLICATION FILED MAY 11, 1907.
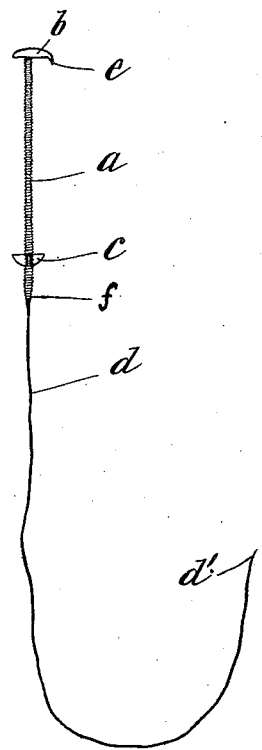
Witnesses.
S. Newman.
H. D. Penney
By his Attorney
F. H. Richards.
Inventor.
Antoine Depage.

UNITED STATES PATENT OFFICE.

ANTOINE DEPAGE, OF BRUSSELS, BELGIUM.

SURGICAL SCREW-BOLT.

No. 887,074.     Specification of Letters Patent.     Patented May 12, 1908.

Application filed May 11, 1907. Serial No. 373,153.

*To all whom it may concern:*

Be it known that I, ANTOINE DEPAGE, a subject of the Kingdom of Belgium, residing in Brussels, in Belgium, have invented certain new and useful Improvements in or Connected with Surgical Screw-Bolts; and I do hereby declare the following to be a full, clear, and exact description of the invention, such as will enable others skilled in the art to which it appertains to make and use the same, reference being had to the accompanying drawings, and to letters or figures of reference marked therein, which form a part of this specification.

The invention has for its object improvements in or connected with surgical screw bolts with a view to facilitate their use for uniting parts which are difficult of access, where it is difficult to pass the bolt through the bolt hole, or where the bolt hole easily closes, for instance, with textile material, felt and bone.

In the accompanying drawing the figure shows a view of this improved device.

The bolt is characterized by its end being tapered and extended into a thin pliable wire, which facilitates the passing of the bolt into the bolt hole. This improved bolt is particularly useful in uniting fractured bones or for holding together parts of the body and in other situations where the hole or opening made for the bolt has a tendency to quickly close upon the withdrawal of the instrument employed for making the hole. The elongated reduced end being rigid with the bolt serves as a guide when the bolt is being pushed into an opening or hole prepared for it. And the connecting portion between the reduced end and the body of the bolt being tapered, the facility of entering the bolt into its hole through the guidance of the wire or extension $d$ is increased. The bolt $a$ is provided as usual with a head $b$ and nut $c$ for effecting the connection.

The long thin flexible wire $d$, $d'$, forms an extension of the bolt. The bolt is tapered at $f$ and is extended into the flexible wire. Before introducing the bolt into the parts to be connected, the nut $c$ is first unscrewed, the hole for the bolt $a$ is bored in the parts by an auger or the like, and the end $d'$ of the pliable wire $d$ is passed, after the hole has been bored, into the cavity of the auger or the like, and while removing the latter, the end $d'$ is pushed through the material. The wire $d$ and bolt $a$ are then drawn through the hole, by means of suitable instruments, the nut $c$ screwed on and tightened up, preferably by means of a screw-driver having a cavity which allows the wire $d$ and the bolt $a$ to pass through it. After effecting the connection, the superfluous flexible wire $d$ is cut off or removed in any suitable way.

In order to prevent the head $b$ and bolt $a$ from turning when the nut is being tightened up, the head $b$ may be provided with a pin or a point $e$ which projects into the material.

Having now particularly described and ascertained the nature of my said invention and in what manner the same is to be performed I declare that what I claim is:—

1. A screw for surgical purposes comprising a slender elongated and threaded shank having a head and a tapered end, said end terminating in a pliable wire of less diameter than the screw and by means of which the screw may be readily drawn into a constricted opening, and a clamping nut on said threaded shank.

2. A screw for surgical purposes comprising a slender elongated and threaded shank having a head provided with a pin and a tapered end, said end terminating in a pliable wire integral therewith and of less diameter than the screw and by means of which the screw may be readily drawn into a constricted opening, and a clamping nut on said threaded shank.

In testimony that I claim the foregoing as my invention, I have signed my name in presence of two subscribing witnesses.

ANTOINE DEPAGE.

Witnesses:
   GEORGES VANDER HAEGHEN,
   JULES GHILAIN.